United States Patent
Bozek et al.

(10) Patent No.: US 8,276,139 B2
(45) Date of Patent: Sep. 25, 2012

(54) PROVISIONING VIRTUAL MACHINE PLACEMENT

(75) Inventors: James J. Bozek, Bothell, WA (US); Bruce A. Smith, Austin, TX (US); Edward S. Suffern, Chapel Hill, NC (US); James L. Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 12/570,320

(22) Filed: Sep. 30, 2009

(65) Prior Publication Data

US 2011/0078679 A1    Mar. 31, 2011

(51) Int. Cl.
G06F 9/455    (2006.01)

(52) U.S. Cl. ............ 718/1; 718/102; 718/103; 718/104; 709/223; 709/226; 370/395.2

(58) Field of Classification Search .................. None
See application file for complete search history.

(56) References Cited

U.S. PATENT DOCUMENTS

| | | | |
|---|---|---|---|
| 6,950,438 B1 | 9/2005 | Owen et al. | |
| 7,260,820 B1 | 8/2007 | Waldspurger | |
| 7,296,267 B2 | 11/2007 | Cota-Robles et al. | |
| 7,412,492 B1 | 8/2008 | Waldspurger | |
| 2001/0039581 A1* | 11/2001 | Deng et al. | 709/226 |
| 2004/0244001 A1* | 12/2004 | Haller et al. | 718/100 |
| 2005/0198633 A1 | 9/2005 | Lantz et al. | |
| 2007/0044108 A1 | 2/2007 | Panesar et al. | |
| 2007/0208843 A1* | 9/2007 | Wexler et al. | 709/223 |
| 2008/0046610 A1 | 2/2008 | Tripathi et al. | |
| 2008/0075101 A1* | 3/2008 | Illikkal et al. | 370/412 |
| 2008/0126580 A1 | 5/2008 | Tripathi et al. | |
| 2008/0184229 A1* | 7/2008 | Rosu et al. | 718/1 |
| 2009/0006702 A1 | 1/2009 | Sarangdhar et al. | |
| 2009/0100237 A1 | 4/2009 | Orikasa et al. | |
| 2009/0164356 A1 | 6/2009 | Bakman | |
| 2009/0172660 A1 | 7/2009 | Klotz, Jr. et al. | |
| 2009/0304002 A1* | 12/2009 | Yu et al. | 370/395.3 |

OTHER PUBLICATIONS

Kang, et al. "Proportional Disk I/O Bandwidth Management for Server Virtualization Environment" Computer Science and Information Technology, 2008; ICCSIT '08; International Conference on; Aug. 29, 2008-Sep. 2, 2008; pp. 647-653.

Yu et al. "XEN-Based HPC: A Parallel I/O Perspective" Cluster Computing and The Grid, 2008; CCGRID '08' 8th IEEE International Symposium on; May 19-22, 2008; pp. 154-161.

(Continued)

*Primary Examiner* — Emerson Puente
*Assistant Examiner* — Sisley Kim
(74) *Attorney, Agent, or Firm* — Cynthia G. Seal; Law Office of Jim Boice

(57) ABSTRACT

Virtual machines are provisioned computers in a computer environment based on input/output (I/O) requirements of software tasks. A workload request, requesting the execution of a software task on a virtual machine, is received. The I/O requirements of the software task are matched to an optimal computer, in the computer environment, that has an I/O bandwidth capability that best matches the I/O requirements of the software task. The software task is then routed to a virtual machine, on the optimal computer, for execution of the software task.

17 Claims, 8 Drawing Sheets

OTHER PUBLICATIONS

Lu et al. "Virtual Machine Memory Access Tracing With Hypervisor Exclusive Cache" 2007 USENIX Annual Technical Conference Proceedings; Article No. 3; 2007; pp. 29-43.

Vilajosana et al. "Towards Decentralized Resource Allocation for Collaborative Peer to Peer Learning" Complex, Intelligent and Software Intensive Systems, 2008; CISIS 2008; International Conference on; Mar. 4-7, 2008; pp. 501-506.

Wang et al. "A Bandwidth Management Technique for Hierarchical Storage in Large-Scale Multimedia Servers" Multimedia Computing and Systems '97 Proceedings; IEEE International Conference on; Jun. 3-6, 1997; pp. 261-268.

Begnum et al. "Decision Support for Virtual Machine Re-Provisioning in Production Environments" Proceedings of the 21st Large Installation System Administration Conference; Lisa '07; USENIX Association, Nov. 11-16, 2007; Dallas, Texas, USA; pp. 95-104.

Dossier AUS920080732: "Method and System for Performance Isolation in Virtualized Environments".

* cited by examiner

| | |
|---|---|
| • 11h = ETHERNET SWITCH MODULE | • 0Xh = NOT IMPLEMENTED |
| • 12h = FIBRE CHANNEL SWITCH MODULE | • 1Xh = ETHERNET |
| • 14h = INFINIBAND SWITCH MODULE | • 2Xh = FIBRE CHANNEL |
| • 15h = SCALABILITY PORT SWITCH MODULE | • 3Xh = SCALABILITY |
| • 16h = MIXED PROTOCOL SWITCH mODULE | • 4Xh = INFINIBAND |
| • 1Ah = HSSM MODULE (SEE TYPE SUB-CODE) | • 5Xh = PCI-EXPRESS |
| • 1Bh = BRIDGE MODULE (SEE TYPE SUB-CODE) | • 6Xh = CIRPACK |
| • 1Ch = NETWORK BLADE (SEE TYPE SUB-CODE) | • 7Xh = SAS |
| • 1Eh = OPTICAL PASS THRU MODULE | • 8Xh - DXh = RESERVED |
| • 1Fh = SERIAL PORT MODULE | • EXh = MYRINET |
| • 20h = RESERVED FOR ASCII BLANK - MFG PGM ERROR | • FXh = SERIAL |
| • 21h = ETHERNET DAUGHTER CARD | |
| • 22h = FIBRE CHANNEL DAUGHTER CARD | • X0h = NOT IMPLEMENTED |
| • 23h = SCSI SIDE CARD / EXPANSION CARD / MODULE (BSE-I) | • X1h = 1.0 GBIT |
| • 24h = INFINIBAND DAUGHTER CARD | • X2h = 2.0 GBIT |
| • 25h = SCALEABILITY PORT DAUGHTER CARD | • X3h = 2.5 GBIT |
| • 26h MIXED PROTOCOL DAUGHTER CARD | • X4h = 4.0 GBIT |
| • 27h = PCI I/O EXPANSION SIDE CARD | • X5h = 5.0 GBIT |
| • 28h = COPPER PASS THRU MODULE |     • X6h = 3.0 GBIT |
| • 29h = CIRPACK SW - CLOCK DIST. MODULE |     • X7h = 6.0 GBIT |
| • 2Ah = SIDE CARDS (SEE TYPE SUB-CODE) | • X8 - X9h = RESERVED |
| • 2Bh = HIGH SPEED DAUGHTER CARD (SEE TYPE SUB-CODE) | • XAh = 10.0 GBIT |
| • 2Dh = MYRINET + SERIAL DAUGHTER CARD |     • XB - XDh = RESERVED |
| • 2Eh = MYRINET DAUGHTER CARD |     • XEh = 100 MBIT |
| • 2Fh = SERIAL PORT DAUGHTER CARD | |
| • 30h = iSCSI DAUGHTER CARD (HOUSTON) | |
| • 31h = NON-MID PLANE CONNECTED DAUGHTER CARD | |
| • 32h = INTERPOSER | |
| • 33h = MULTI-FUNCTION DAUGHTER CARD | |
| • 38h = BLADE cKVM (SEE TYPE SUB-CODE) | |
| • 39h = SIMPLE PASS-THRU SWITCH | |

PROVISIONING VIRTUAL MACHINE PLACEMENT

BACKGROUND

The present disclosure relates to the field of computers, and specifically to virtualization of software on a number of physical servers that are configured in computer virtualization clouds. Still more particularly, the present disclosure relates to provisioning placement and provisioning of virtual machines on computers in computer virtualization clouds.

BRIEF SUMMARY

Virtual machines are provisioned in a blade chassis based on input/output (I/O) requirements of software tasks. A workload request, requesting the execution of a software task on a virtual machine, is received. The I/O requirements of the software task are matched to an optimal blade, in the blade chassis, that has an I/O bandwidth capability that best matches the I/O requirements of the software task. The software task is then routed to a virtual machine, on the optimal blade, for execution of the software task.

BRIEF DESCRIPTION OF THE SEVERAL VIEWS OF THE DRAWINGS

FIG. 5 depicts exemplary vital product data (VPD) used to initialize the provisioning of virtual machines on blades in the blade chassis;

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
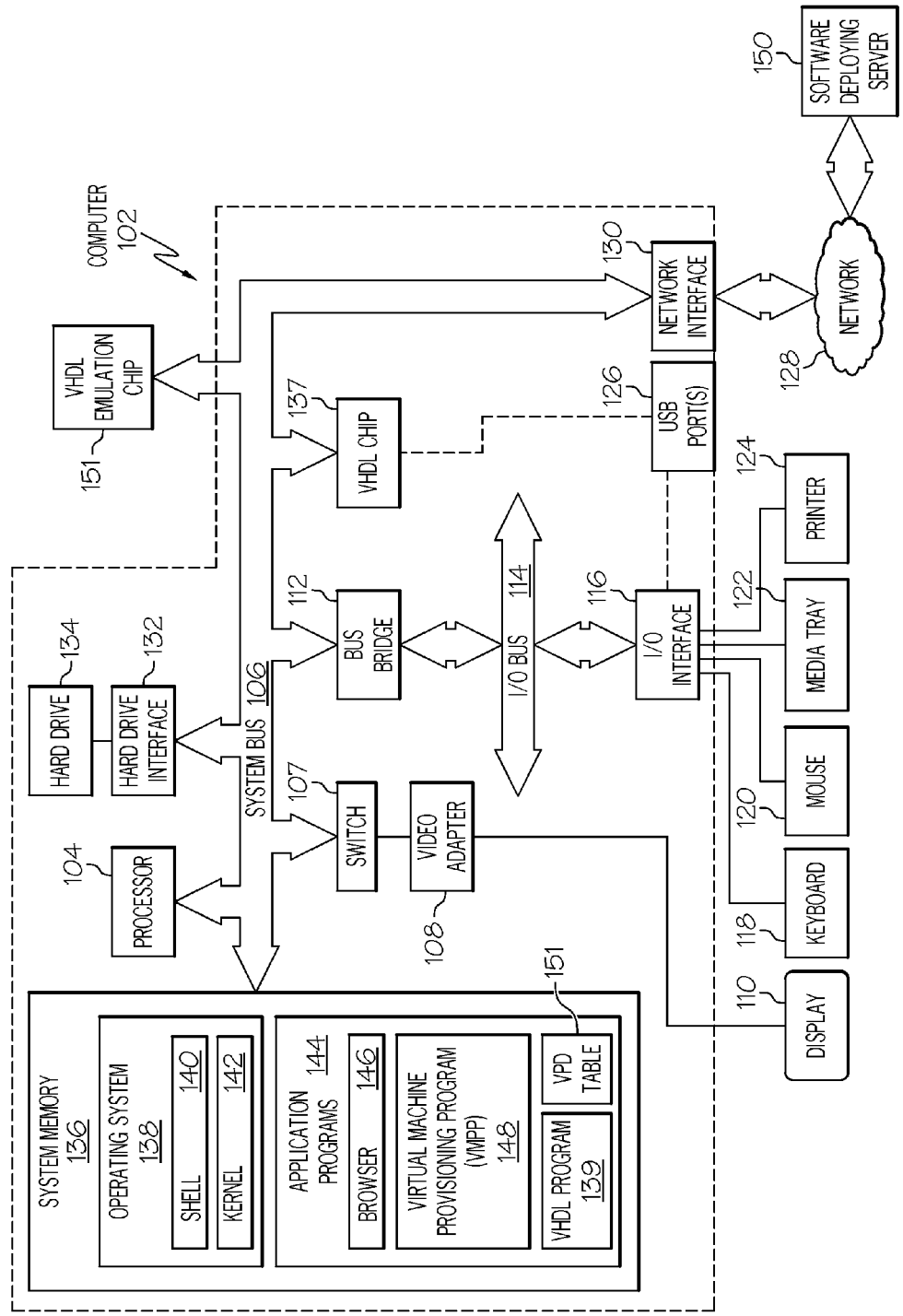
FIG. 1 depicts an exemplary computer that may be utilized by the presently disclosed method, system, and/or computer program product.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, as well as provisioning manager/management node 220, server blades 204a-n shown below in FIG. 2, server blade 602 shown in FIG. 6, and/or server blade 702 shown in FIG. 7. Note that while blades described in the present disclosure are described and depicted in exemplary manner as server blades in a blade chassis, some or all of the computers described herein may be stand-alone computers, servers, or other integrated or stand-alone computing devices. Thus, the terms "blade," "server blade," "computer," and "server" are used interchangeably in the present descriptions.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., virtual machine provisioning program—VMPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a virtual machine provisioning program (VMPP) 148. VMPP 148 includes code for implementing the processes described below, including those described in FIGS. 2-8. VMPP 148 is able to communicate with a vital product data (VPD) table 151, which provides required VPD data described below. In one embodiment, computer 102 is able to download VMPP 148 from software deploying server 150, including in an on-demand basis. Note further that, in one embodiment of the present invention, software deploying server 150 performs all of the functions associated with the present invention (including execution of VMPP 148), thus freeing computer 102 from having to use its own internal computing resources to execute VMPP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes VHDL program 139 to configure VHDL chip 137, which may be an FPGA, ASIC, etc In another embodiment of the present invention, execution of instructions from VMPP 148 results in a utilization of VHDL program 139 to program a VHDL emulation chip 151. VHDL emulation chip 151 may incorporate a similar architecture as described above for VHDL chip 137. Once VMPP 148 and VHDL program 139 program VHDL emulation chip 151, VHDL emulation chip 151 performs, as hardware, some or all functions described by one or more executions of some or all of the instructions found in VMPP 148. That is, the VHDL emulation chip 151 is a hardware emulation of some or all of the software instructions found in VMPP 148. In one embodiment, VHDL emulation chip 151 is a programmable read only memory (PROM) that, once burned in accordance with instructions from VMPP 148 and VHDL program 139, is permanently transformed into a new circuitry that performs the functions needed to perform the process described below in FIGS. 2-8.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Modern technical companies are entering into a cloud computing environment in which a user workload is assigned a virtual machine (VM) somewhere in the computing cloud. This virtual machine provides the software operating system and physical resources such as processing power and memory to support the user's application workload. The present disclosure describes a method for determining the input/output (I/O) capability of a hardware platform, which supports the virtual machine, at the initial deployment. A number of provisioning virtual machines within a server farm (e.g., a blade chassis) are then assigned/provisioned based on the I/O network performance capability of the physical server (e.g., blade). For permanent storage intensive application a similar method is described herein based on hard disk accesses. Furthermore, a method is described herein for over-subscription of I/O bandwidth guaranteeing a usage percentage based on over-subscription.

Different applications require different hardware platforms. The virtualized market segments are divided into four categories: web servers, high performance computing, remote client, and database management. A network type application, such as a web server, is heavily I/O intensive and requires additional I/O capability of the physical server. Database management requires many accesses to the hard drive. Financial applications using database management require much more CPU processing power and memory with a reduced requirement on I/O bandwidth and hard drive accesses. Current provisioning managers do not take into account the physical I/O or hard drive configuration in determining the number of virtual machines able to execute on the server. In one embodiment of the present disclosure, this hardware configuration information is obtained before the provisioning server loads the virtual machines onto the physical server. With this information, the provisioning software (i.e., VMPP 148 shown in FIG. 1) can correlate the number of VMs to the I/O capacity required.

The present disclosure thus describes a method to optimize the assignment of virtual machines in a physical server based on the hardware configuration of 1) the I/O capability and/or 2) the hard disk drive (HDD) capacity of the physical server to guarantee non-over-subscription of bandwidth or HDD access capability. In one embodiment, this hardware configuration is obtained at power on by the VMPP 148 utilizing VPD data from VPD table 151. This embodiment prevents over-subscription of virtual machine provisioning, and also guarantees response time or bandwidth usage as a percentage basis based on the contents of the VPD table 151.

Figure 2:
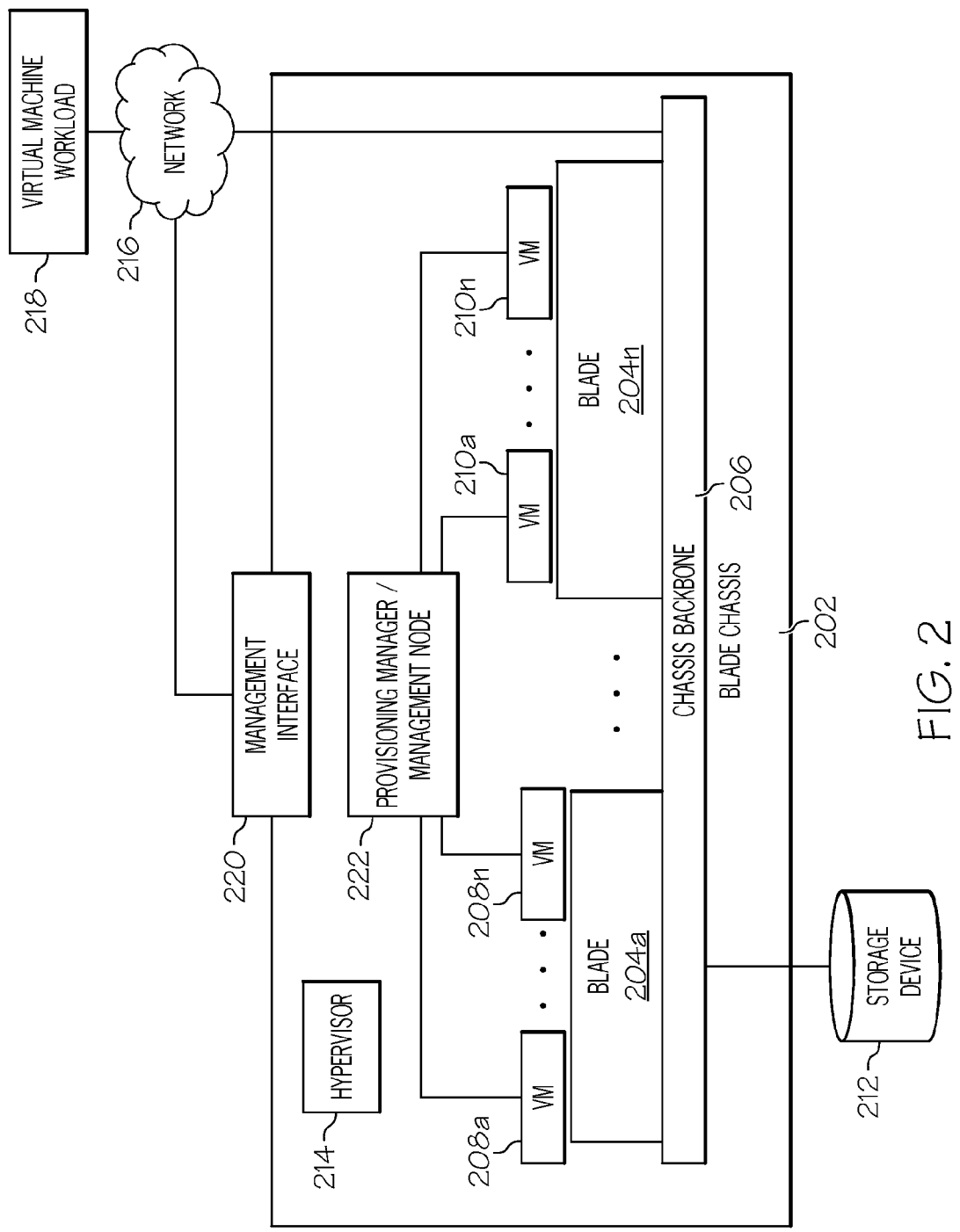
FIG. 2 illustrates an exemplary blade chassis that may be utilized by the presently disclosed method, system, and/or computer program product.

With reference now to FIG. 2, an exemplary blade chassis 202 operating as a "cloud" environment for a pool of resources is presented. Blade chassis 202 comprises a plurality of blades 204*a-n* (where "n" is an integer) coupled to a chassis backbone 206. Each blade supports one or more virtual machines (VMs). As known to those skilled in the art of computers, a VM is a software implementation (emulation) of a physical computer. A single hardware computer (blade) can support multiple VMs, each running the same, different, or shared operating systems. In one embodiment, each VM can be specifically tailored and reserved for executing software tasks 1) of a particular type (e.g., database management, graphics, word processing etc.); 2) for a particular user, subscriber, client, group or other entity; 3) at a particular time of day or day of week (e.g., at a permitted time of day or schedule); etc.

As depicted in FIG. 2, blade 204*a* supports VMs 208*a-n* (where "n" is an integer), and blade 204*n* supports VMs 210*a-n* (wherein "n" is an integer). Blades 204*a-n* are coupled to a storage device 212 that provides a hypervisor 214, guest operating systems, and applications for users (not shown). Provisioning software from the storage device 212 allocates boot storage within the storage device 212 to contain the maximum number of guest operating systems, and associates applications based on the total amount of storage (found within storage device 212) within the cloud. For example, support of one guest operating system and its associated applications may require 1 GByte of physical memory storage within storage device 212 to store the application, and another 1 GByte of memory space within storage device 212 to execute that application. If the total amount of memory storage within a physical server such as boot storage device 212 is 64 GB, the provisioning software assumes that the physical server can support 32 virtual machines. In this embodiment, the computer hardware characteristics are communicated from the VPD 151 to the VMPP 148. The VMPP 148 communicates the computer physical characteristics to the blade chassis provisioning manager 222 to the management interface 220 through the network 216, and then to the Virtual Machine Workload entity 218.

Note that chassis backbone 206 is also coupled to a network 216, which may be a public network (e.g., the Internet), a private network (e.g., a virtual private network or an actual internal hardware network), etc. Network 216 permits a virtual machine workload 218 to be communicated to a management interface 220 of the blade chassis 202. This virtual machine workload 218 is a software task whose execution, on any of the VMs within the blade chassis 202, is to request and coordinate deployment of workload resources with the management interface 220. The management interface 220 then transmits this workload request to a provisioning manager/management node 222, which is hardware and/or software logic capable of configuring VMs within the blade chassis 202 to execute the requested software task. In essence the virtual machine workload 218 manages the overall provisioning of VMs by communicating with the blade chassis management interface 220 and provisioning management node 222. Then this request is further communicated to the VMPP 148 in the generic computer system. Note that blade chassis 202 is an exemplary computer environment in which the presently disclosed system can operate. The scope of the presently disclosed system should not be limited to merely blade chassis, however. That is, the presently disclosed method and process can also be used in any computer environment that utilizes some type of workload management, as described herein. Thus, the terms "blade chassis," "computer chassis," and "computer environment" are used interchangeably to describe a computer system that manages multiple computers/blades/servers.

Figure 3:
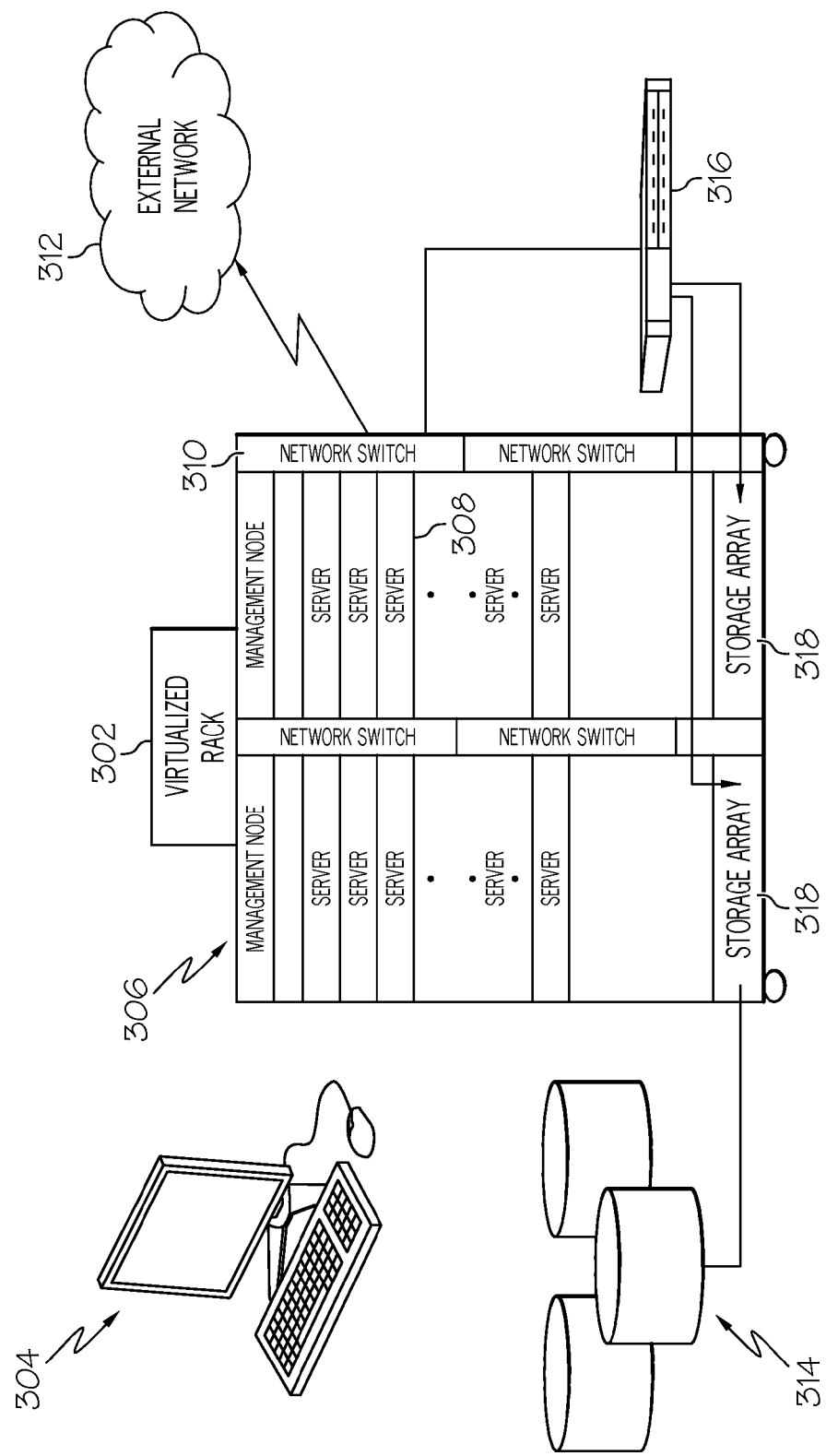
FIG. 3 depicts another embodiment of the present disclosed method utilizing multiple physical computers in a virtualized rack.
Figure 4:
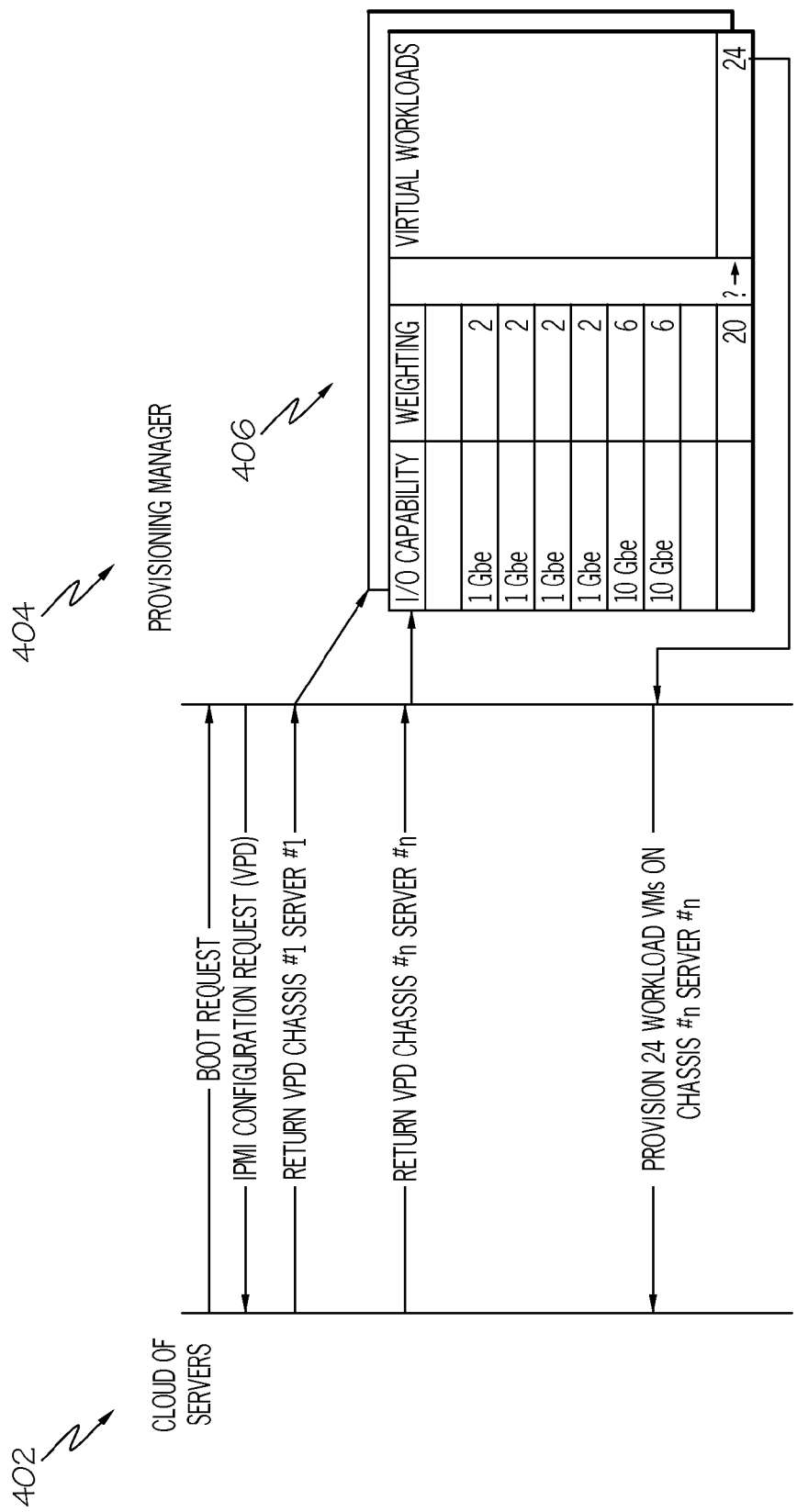
FIG. 4 illustrates a ladder chart of exemplary steps taken to initialize the provisioning of virtual machines on blades in a blade chassis.

FIG. 3 presents one embodiment of the present invention with multiple physical servers in a 19-inch rack environment. This configuration is similar to the configuration 202 shown in FIG. 2 except FIG. 3 depicts a virtualized rack 302. A user 304 is able to transmit a request for execution of a software task to a management node 306 (analogous to provisioning manager/management node 222 shown in FIG. 2). Based on the I/O capabilities of a particular server 308 and its coupled network switch 310 to communicate with external network 312 and storage devices 314 (via gateway 316 and virtualized storage arrays 318), the user's request is addressed to the appropriate and optimal computer (e.g., server 308).

Before a computer (herein either a blade or server) can be selected to execute the requested task, the virtual machines need to be initialized and provisioned. Thus, with reference now to FIG. 4, a ladder chart 400 of exemplary steps taken to perform such initialization and provisioning is presented. A computer (e.g., a blade, server, etc.) from a cloud of servers 402 (e.g., blades 204*a-n* shown in FIG. 2) sends a boot request to the provisioning manager 404 (e.g., provisioning manager/management node 222 shown in FIG. 2). The provisioning manager 404 responds with an intelligent platform management interface (IPMI) configuration request for vital product data (VPD) of that blade. Exemplary information found in the VPD is shown in VPD table 500 in FIG. 5 (schematically depicted in FIG. 1 as VPD table 151), and comprises information regarding what packet protocols are supported for a particular computer, what types of I/O and processor cards are attached to that computer, what bandwidth is supported for external communications, etc. The server responds by sending this VPD data to the provisioning manager 404. In the example shown, part of this VPD data is the I/O capability of "Server #n", which has four 1 GBit I/O cards (i.e., an I/O card having a 1 Gbps bandwidth/speed) and two 10 GBit I/O cards (i.e., I/O cards each having 10 Gbps bandwidth/speed). While a 10 GBit I/O card has 10 times more bandwidth than a 1 GBit I/O card, their respective capabilities are not weighed linearly. That is, the 10 GBit I/O card is only given a weighting that is three times that of a 1 GBit I/O card (6 versus 2). This weighting provides a more accurate depiction of the true I/O capability of the blade, since 10 GBits is a top "burst speed" that the 10 GBit I/O card can support, and not an accurate description of the 10 GBit I/O's ability to support steady I/O traffic. These weighted metrics are then summed (to a total of 20), providing a value that can be used to define how many workload VMs (in this example, a total of 24, which number is derived from the summed number of metrics (20) in this example) can be provisioned on that computer.

With reference again to FIG. 3, virtualized rack 302 is shown in exemplary form as a 19-inch rack environment used for virtualized computing. Virtualized rack 302 is a blade chassis holding multiple servers. Each physical server (including server 308) has I/O network adapters to maximize input/output transactions. To determine the optimal number of virtual machines able to execute on the server, the provisioning manager must be able to retrieve the network configuration of the physical server (I/O capability) and coordinate this information to properly provision VMs on each of the servers. For example, a fiber channel adapter operating storage devices at 4 Gbps can support a different number of virtual machines than a web application running 10 Gbps Ethernet traffic. The same argument can be used for comparing a 1 Gbps Ethernet connection versus a 10 Gbps Ethernet connection.

Figure 6:
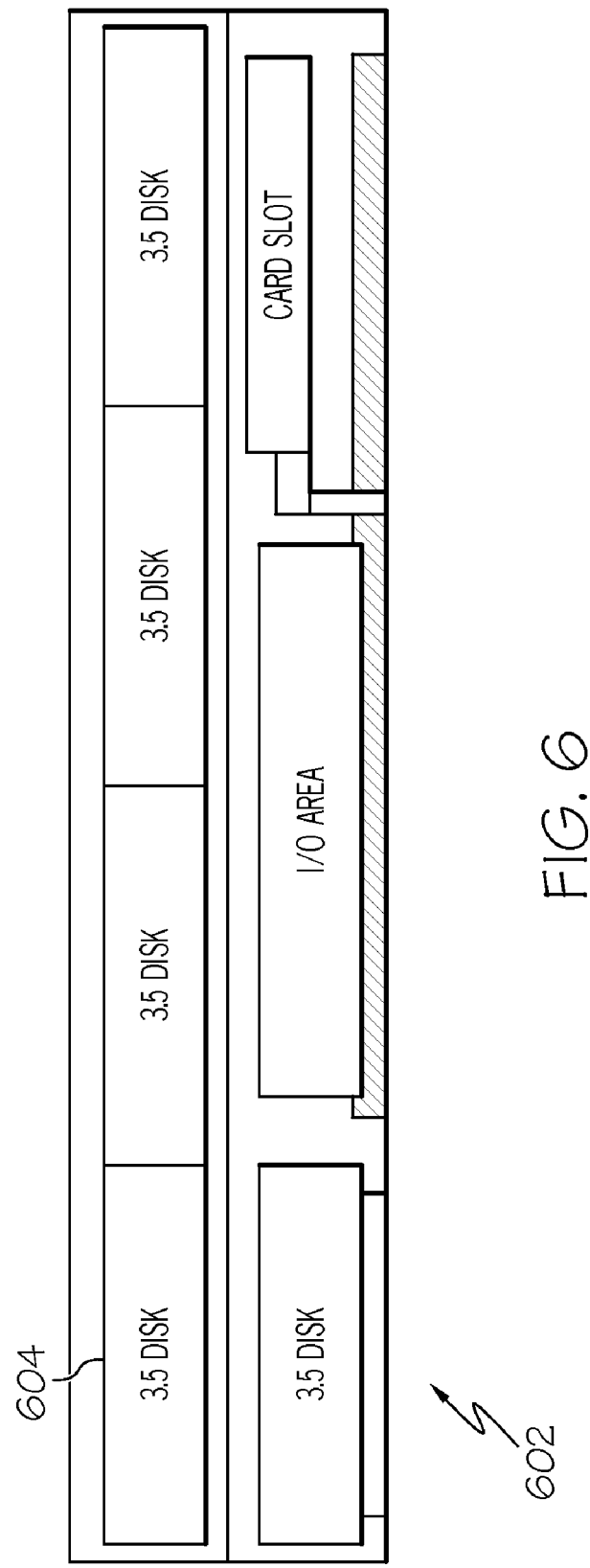
FIG. 6 illustrates an exemplary high-storage low-I/O (input/output) computer that can reside in the blade chassis or as a stand-alone server.
Figure 7:
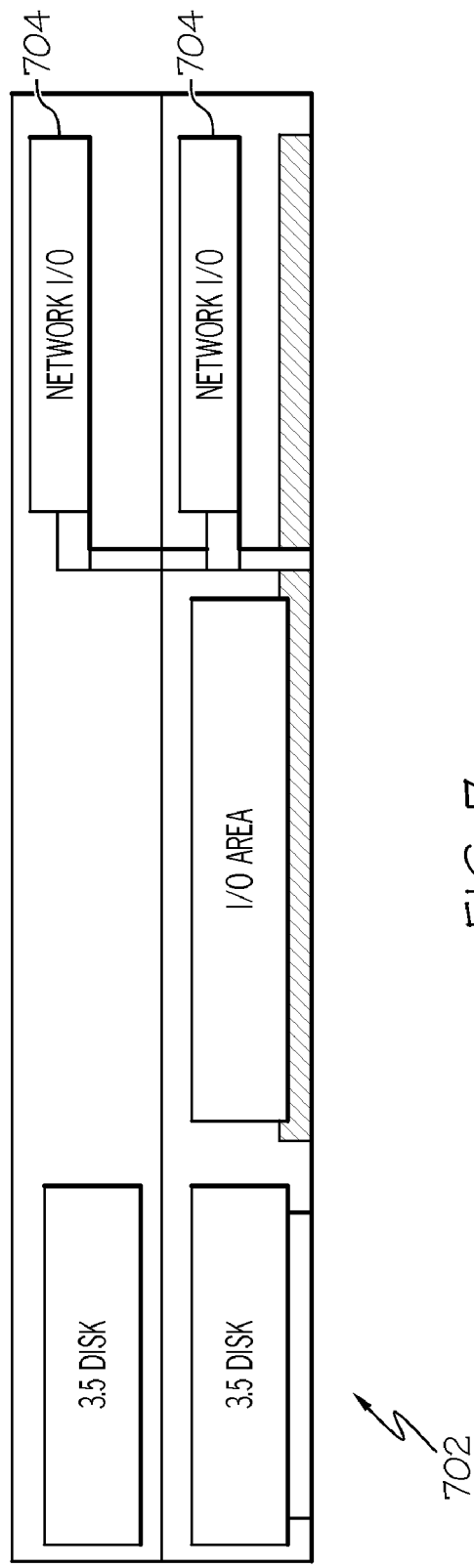
FIG. 7 depicts an exemplary low-storage high-I/O computer that can reside in the blade chassis or as a stand-alone server.

Shown in FIGS. 6-7 are examples of I/O-rich or HDD-rich servers housed within the server rack. For example, computer 602 is rich in HDD drives 604, while computer 702 is rich in network I/Os cards 704. In order to effectively allocate the virtual machines guaranteeing adequate bandwidth and response time, the provisioning manager first obtains the I/O configuration, as found in the VPD table 151 shown in FIG. 1, and sends this to a management entity (which may be part of the provisioning manger/management node 222 shown in FIG. 2). Using data from the VPD table (shown in exemplary manner in FIG. 5), the provisioning manager is able to properly assign the optimum number of virtual machines to provide maximum input/output capability and response time.

If required, the provisioning server can assign more virtual machines to a physical server at a reduction in the performance. From a provisioning management entity in a virtualized environment, a "virtual provisioning" guarantees either a certain bandwidth per user or a certain response time per user based on the physical I/O hardware configuration. This method can be used to determine whether the given virtualized cloud (environment) is over-provisioned or under-provisioned for guaranteeing bandwidth and performance. It can also be used to determine the probability that the I/O traffic is over a specified limit. For example, a customer may accept assigning 100 virtual machines to a virtual cloud with the assumption that 98% of the time all users have an acceptable response time and bandwidth. In contrast, the same system could support only 75 virtual machines and guarantee that 100% of the time all users have acceptable response time. Thus, as shown in exemplary manner above in FIG. 4, standard intelligent platform management interface (IPMI) commands are used to obtain the server I/O configuration. This information is then cross-referenced to a bandwidth allocation table to optimize the virtual machine allocation. Thus, in the example described above in FIG. 4, the server has an I/O capability of four 1 Gbps and two 10 Gbps Ethernet links. Each interface is assigned a weighting based on network capacity. The sum of this configuration corresponds to the number of virtual machines that can be assigned to a server. This process is replicated for all the chassis and servers in the virtualization cloud.

Figure 8:
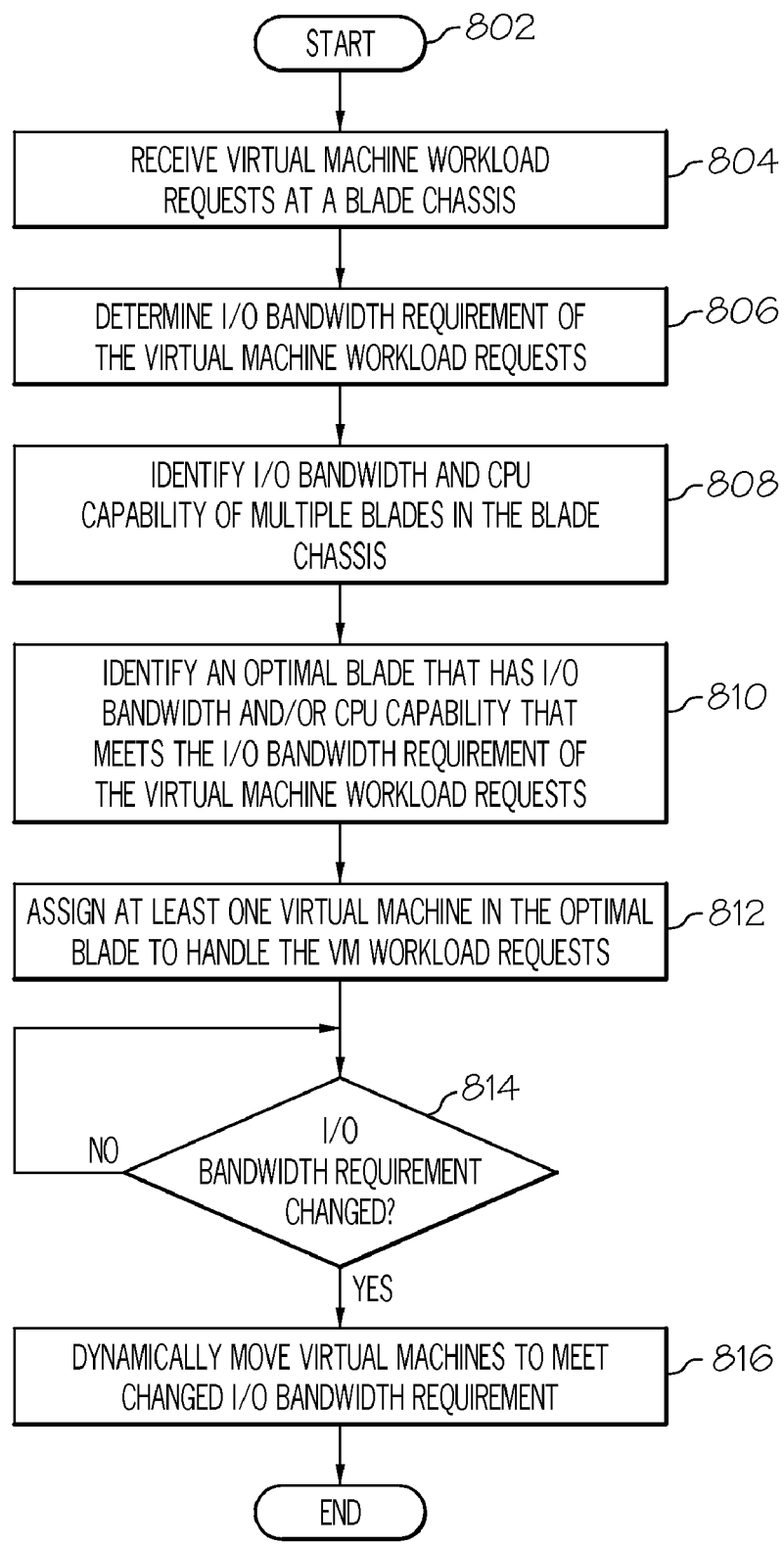
FIG. 8 is a high-level flow-chart of exemplary steps processed by a computer to dynamically provision virtual machine placement based on hardware input/output (I/O) criteria.

With reference now to FIG. 8, a high-level flow-chart of exemplary steps processed by a computer to dynamically provision virtual machine placement based on hardware I/O criteria is presented. After initiator block 802, which may be prompted by a provisioning manager configuring VMs on multiple computers in a manner described above, a workload request is received (block 804). This workload request is a request from a user for a virtual machine (VM) to execute a software task. The request does not specify any particular VM or computer to execute the software task. Rather, the request describes the software task with enough detail to allow the provisioning manager to determine the type and number of VMs needed. This detail includes, but is not limited to, general I/O and processing requirements of the software task, when the software task is to be run, how results will be managed (i.e., whether output will be stored locally via an inter I/O bus or sent via a network I/O to an external storage location), etc.

The provisioning manager then utilizes these details to determine how much I/O bandwidth is needed for the software task (block 806). In one embodiment, the provisioning manager also determines the processing requirement (i.e., the CPU requirements) of the software task. The provisioning manager then identifies the I/O bandwidth and processing capability, for example, of multiple blades in the blade chassis (block 808), using data from the VPD table as described above. The provisioning manager then identifies which blade has I/O bandwidth and/or processing capability that matches the needs of the software task for execution (block 810). If only I/O bandwidth is considered in this matching, then the processing capability is ignored. However, if processing capability is considered, then it is likely that two blades (a first optimal blade and a second optimal blade) will be competing for the job of supporting a VM to run the software task. One way of managing this competition is to weigh the I/O bandwidth requirement against the processing requirement of the software task. If the I/O bandwidth requirement is more important, then the first optimal blade with the higher I/O bandwidth will likely get the job. However, if the first optimal blade just barely meets the I/O requirement of the software task, and the second optimal blade (with more processing capabilities due to having more processors and/or more local storage drives) easily handles the processing requirements of the software task, then the second optimal blade may be awarded the job.

With reference to block 812, once the optimal blade is identified, a VM is configured (if not already done) on that optimal blade to handle the software task. As noted above, the provisioning manager can assign a weight factor to each I/O interface in the first optimal blade, and then sum those weight factors to establish a weighted sum of all of the weight factors. Using this weighted sum, the provisioning manager can determine a maximum number of software tasks that can be handled by the first optimal blade to aid in establishing how many VMs can be supported by that blade.

Preferably, multiple job requests will be coming in to the provisioning manager. To handle these multiple job requests, the provisioning manager can identify the first optimal blade as having a high I/O bandwidth capability due to having more I/O interfaces than any other blade in the blade chassis, and can identify the second optimal blade as having a high processing capability due to having more processors than any other blade in the blade chassis. In this scenario, the processing manager assigns execution of an I/O intensive application (e.g., a web server application) to one or more VMs on the first optimal blade, and assigns execution of a processing intensive application (e.g., a database management application) to one or more VMs on the second optimal blade.

As indicated in query block 814, I/O bandwidth requirements may change over time. These changes can be caused by old tasks completing, new tasks initiating, parameters of the task changing, etc. If this occurs, then virtual machines are dynamically moved to other blades (block 816). For example, assume that each blade supports multiple VMs. In response to the I/O bandwidth requirement changing for one or more software tasks, one or more VMs are dynamically moved from a first blade to a second blade to optimize usage of the second blade for executing these software tasks. The I/O bandwidth requirement can also be based on establishing a minimum acceptable response time for execution of the software task. Thus, in response to the first optimal blade failing to support VMs that can meet the minimum acceptable response time, the software task can be re-routed to another blade that has I/O interfaces with greater bandwidth than the first optimal blade.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of provisioning virtual machines in a computer chassis, the computer-implemented method comprising:

receiving a workload request, wherein the workload request is a request for a virtual machine (VM) to execute a software task;

determining a relative importance of an input/output (I/O) bandwidth requirement and a processing requirement of the software task;

identifying an I/O bandwidth capability and a processing capability for each of multiple computers in a computer chassis;

identifying a first optimal computer as having a highest I/O bandwidth capability due to having more I/O interfaces than any other computer in the computer chassis, wherein the first optimal computer has the I/O bandwidth capability that optimally matches the I/O bandwidth requirement of the software task over other computers in the computer chassis;

identifying a second optimal computer as having a highest processing capability due to having more processors and more local storage drives than any other computer in the computer chassis, wherein the second optimal computer has the processing capability that optimally matches the processing requirement of the software task over other computers in the computer chassis;

competing, by the first and second optimal computers, for a job to run the software task;

in response to determining that the I/O bandwidth requirement of the software task is more important than the processing requirement of the software task, assigning execution of an I/O intensive application to at least one VM on the first optimal computer; and in response to determining that the processing requirement of the software task is more important than the I/O bandwidth requirement of the software task, assigning execution of a processing intensive application to at least one VM on the second optimal computer.

2. The computer-implemented method of claim 1, further comprising:

determining the processing requirement of the software task;

identifying the processing capability for each of the multiple computers in the computer chassis;

matching the processing requirement to the second optimal computer in the computer chassis, wherein the second optimal computer has the processing capability that matches the processing requirement of the software task better than the other computers in the computer chassis;

weighing the I/O bandwidth requirement against the processing requirement of the software task, wherein the weighing determines which requirement is more significant in view of the I/O bandwidth capability of the first optimal computer and the processing capability of the second optimal computer; and routing the workload request to at least one VM on either the first optimal computer or the second optimal computer in accordance with the weighing of the I/O bandwidth requirement against the processing requirement of the software task.

3. The computer-implemented method of claim 1, wherein the I/O intensive application is a web server application, and wherein the processing intensive application is a database management application.

4. The computer-implemented method of claim 1, wherein each computer supports multiple VMs, the computer-implemented method further comprising:

in response to an I/O bandwidth requirement changing for one or more software tasks, dynamically moving at least one VM from the first computer to the second computer to optimize usage of the second computer for executing said one or more software tasks.

5. The computer-implemented method of claim 1, further comprising:

assigning a weight factor to each I/O interface in the first optimal computer, wherein the weight factor adjusts a "burst speed" I/O capacity of said each I/O interface downward in order to reflect a true I/O capability, of said each I/O interface, for supporting steady I/O traffic;

summing the weight factors for all I/O interfaces in the first optimal computer to establish a weighted sum of all of the weight factors; and determining a maximum number of software tasks that the first optimal computer is capable of handling in accordance with the weighted sum.

6. The computer-implemented method of claim 1, further comprising:

establishing a minimum acceptable response time for execution of the software task; and in response to the first optimal computer failing to support at least one VM that meets the minimum acceptable response time, re-routing the software task to another computer that has I/O interfaces with greater bandwidth than the first optimal computer.

7. A computer program product comprising:

a computer readable storage media;

first program instructions to receive a workload request, wherein the workload request is a request for a virtual machine (VM) to execute a software task;

second program instructions to determine a relative importance of an input/output (I/O) bandwidth requirement and a processing requirement of the software task;

third program instructions to identify an I/O bandwidth capability and a processing capability for each of multiple computers in a computer chassis;

fourth program instructions to identify a first optimal computer as having a highest I/O bandwidth capability due to having more I/O interfaces than any other computer in the computer chassis, wherein the first optimal computer has the I/O bandwidth capability that optimally matches the I/O bandwidth requirement of the software task over other computers in the computer chassis;

fifth program instructions to identify a second optimal computer as having a highest processing capability due to having more processors and more local storage drives than any other computer in the computer chassis, wherein the second optimal computer has the processing capability that optimally matches the processing requirement of the software task over other computers in the computer chassis;

sixth program instructions to compete for a job to run the software task by the first and second optimal computers;

seventh program instructions to, in response to determining that the I/O bandwidth requirement of the software task is more important than the processing requirement of the software task, assign execution of an I/O intensive application to at least one VM on the first optimal computer; and eighth program instructions to, in response to determining that the processing requirement of the software task is more important than the I/O bandwidth requirement of the software task, assign execution of a processing intensive application to at least one VM on the second optimal computer;

and wherein said first, second, third, fourth, fifth, sixth, seventh, and eighth program instructions are stored on said computer readable storage media.

8. The computer program product of claim 7, further comprising:

ninth program instructions to determine the processing requirement of the software task;

tenth program instructions to identify the processing capability for each of the multiple computers in the computer chassis;

eleventh program instructions to match the processing requirement to the second optimal computer in the computer chassis, wherein the second optimal computer has the processing capability that matches the processing requirement of the software task better than the other computers in the computer chassis;

twelfth program instructions to weigh the I/O bandwidth requirement against the processing requirement of the software task, wherein the weighing determines which requirement is more significant in view of the I/O bandwidth capability of the first optimal computer and the processing capability of the second optimal computer; and thirteenth program instructions to route the workload request to at least one VM on either the first optimal computer or the second optimal computer in accordance with the weighing of the I/O bandwidth requirement against the processing requirement of the software task; and wherein said ninth, tenth, eleventh, twelfth, and thirteenth program instructions are stored on said computer readable storage media.

9. The computer program product of claim 7, wherein the I/O intensive application is a web server application, and wherein the processing intensive application is a database management application.

10. The computer program product of claim 7, wherein each computer supports multiple VMs, and wherein the computer program product further comprises:

ninth program instructions to, in response to the I/O bandwidth requirement changing for one or more software tasks, dynamically move at least one VM from the first computer to the second computer to optimize usage of the second computer for executing said one or more software tasks; and wherein said ninth program instructions are stored on said computer readable storage media.

11. The computer program product of claim 7, further comprising:

ninth program instructions to assign a weight factor to each I/O interface in the first optimal computer, wherein the weight factor adjusts a "burst speed" I/O capacity of said each I/O interface downward in order to reflect a true I/O capability, of said each I/O interface, for supporting steady I/O traffic;

tenth program instructions to sum the weight factors for all I/O interfaces in the first optimal computer to establish a weighted sum of all of the weight factors; and eleventh program instructions to determine a maximum number of software tasks that the first optimal computer is capable of handling in accordance with the weighted sum; and wherein said ninth, tenth, and eleventh program instructions are stored on said computer readable storage media.

12. The computer program product of claim 7, further comprising:
ninth program instructions to establish a minimum acceptable response time for execution of the software task; and
tenth program instructions to, in response to the first optimal computer failing to support at least one VM that meets the minimum acceptable response time, re-route the software task to another computer that has I/O interfaces with greater bandwidth than the first optimal computer; and wherein
said ninth and tenth program instructions are stored on said computer readable storage media.

13. The computer program product of claim 7, wherein all of said program is downloaded from a software deploying server to a client computer in an on-demand basis.

14. A system comprising:
a processor coupled to a memory, wherein the processor is programmed to provision virtual machines in a computer chassis by:
receiving a workload request, wherein the workload request is a request for a virtual machine (VM) to execute a software task;
determining a relative importance of an input/output (I/O) bandwidth requirement and a processing requirement of the software task;
identifying an I/O bandwidth capability and a processing capability for each of multiple computers in a computer chassis;
identifying a first optimal computer as having a highest I/O bandwidth capability due to having more I/O interfaces than any other computer in the computer chassis, wherein the first optimal computer has the I/O bandwidth capability that optimally matches the I/O bandwidth requirement of the software task over other computers in the computer chassis;
identifying a second optimal computer as having a highest processing capability due to having more processors and more local storage drives than any other computer in the computer chassis, wherein the second optimal computer has the processing capability that optimally matches the processing requirement of the software task over other computers in the computer chassis;
competing, by the first and second optimal computers, for a job to run the software task;
in response to determining that the I/O bandwidth requirement of the software task is more important than the processing requirement of the software task, assigning execution of an I/O intensive application to at least one VM on the first optimal computer; and
in response to determining that the processing requirement of the software task is more important than the I/O bandwidth requirement of the software task, assigning execution of a processing intensive application to at least one VM on the second optimal computer.

15. The system of claim 14, wherein the processor is further programmed to:
determine the processing requirement of the software task;
identify the processing capability for each of the multiple computers in the computer chassis;
match the processing requirement to the second optimal computer in the computer chassis, wherein the second optimal computer has the processing capability that matches the processing requirement of the software task better than the other computers in the computer chassis;
weigh the I/O bandwidth requirement against the processing requirement of the software task, wherein the weighing determines which requirement is more significant in view of the I/O bandwidth capability of the first optimal computer and the processing capability of the second optimal computer; and
route the workload request to at least one VM on either the first optimal computer or the second optimal computer in accordance with the weighing of the I/O bandwidth requirement against the processing requirement of the software task.

16. The system of claim 14, wherein the I/O intensive application is a web server application, and wherein the processing intensive application is a database management application.

17. The system of claim 14, wherein the processor is further programmed to:
assign a weight factor to each I/O interface in the first optimal computer, wherein the weight factor adjusts a "burst speed" I/O capacity of said each I/O interface downward in order to reflect a true I/O capability, of said each I/O interface, for supporting steady I/O traffic;
sum the weight factors for all I/O interfaces in the first optimal computer to establish a weighted sum of all of the weight factors; and
determine a maximum number of software tasks that the first optimal computer is capable of handling in accordance with the weighted sum.

* * * * *